March 27, 1934.        B. McCORMICK         1,952,450
ELECTRIC TRANSMISSION
Filed Nov. 5, 1931
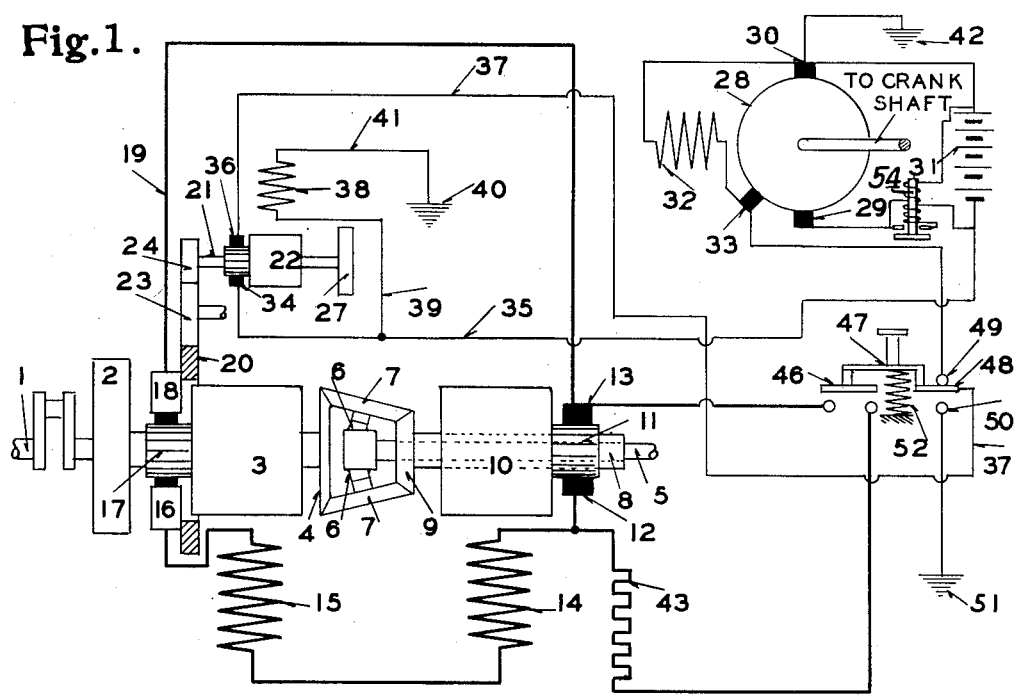
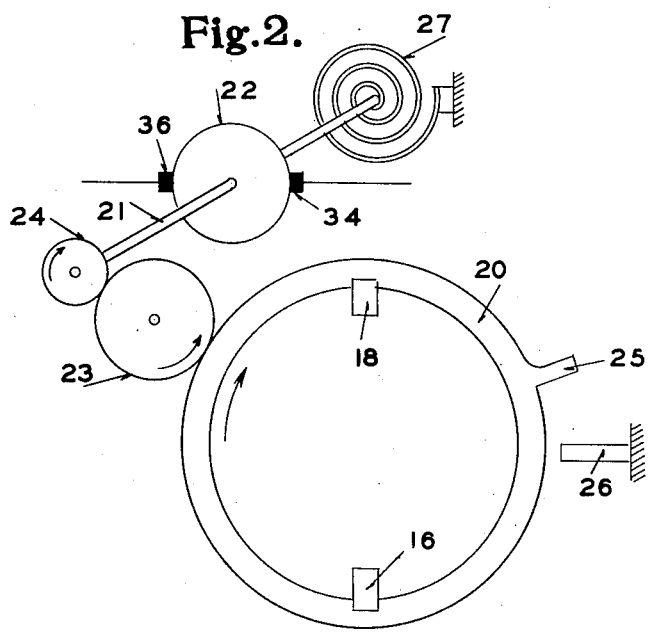
Inventor
B. MC CORMICK
By E. E. Huffman
Att'y.

Patented Mar. 27, 1934

1,952,450

UNITED STATES PATENT OFFICE 1,952,450

ELECTRIC TRANSMISSION

Bradley McCormick, St. Louis, Mo., assignor to Wagner Electric Corporation, St. Louis, Mo., a corporation of Delaware Application November 5, 1931, Serial No. 573,042

8 Claims. (Cl. 172—239)

My invention relates to variable ratio transmission apparatus for vehicles and more particularly to the electro-magnetic type of transmission in which two dynamo-electric machines are interposed between the driving shaft and the driven shaft.

The principal object of my invention is to provide electrical transmission of the type referred to, with control means which positively causes both of the dynamo-electric machines to act as generators to produce a braking action upon the vehicle regardless of the speed of the driving shaft and the functions of the dynamo-electric machines at the time the control means is operated.

Other objects will become apparent from the following description of my invention taken in connection with the accompanying drawing in which Figure 1 is a diagrammatic representation of an electrical transmission embodying my invention; and Figure 2 is a diagrammatic illustration of the means employed for shifting the brushes of one of the dynamo-electric machines.

Referring to the drawing in detail, 1 is the crank shaft of an internal combustion engine upon which is mounted the flywheel 2 in the usual manner. The armature 3 of a dynamo-electric machine, hereinafter called the "booster" dynamo, is connected at one end to the crank shaft 1 and has secured to its other end a bevel gear 4. The driven shaft 5, connected to the wheels of the vehicle, is in alignment with the armature 3 and has secured on its inner end a pair of radially extending short shafts 6 which are inclined at an angle to the axis of the driven shaft. A pair of bevel gears 7 are rotatably mounted on the short shafts 6 and engage the bevel gear 4. A hollow shaft 8 is rotatably mounted upon the driven shaft and has secured thereon a bevel gear 9 in engagement with the bevel gears 7. The armature 10 of a second dynamo-electric machine, hereinafter referred to as the "clutch" dynamo, is also secured to the hollow shaft 8 and is provided at one end with a commutator 11 cooperating with fixed brushes 12 and 13.

The booster dynamo and the clutch dynamo are electrically connected in series. This series relation is secured by connecting brush 12 to the fixed field winding 14 of the clutch dynamo which in turn is connected to the fixed field winding 15 of the booster dynamo, the latter field winding being electrically connected to the brush 16 cooperating with the commutator 17 of the booster dynamo. The second brush 18 of the booster dynamo is directly connected with brush 13 of the clutch dynamo by wire 19, thereby closing the electrical circuit between the booster dynamo and the clutch dynamo.

The brushes 16 and 18 of the booster dynamo are mounted upon a ring 20 provided with external gear teeth. The ring 20 is geared to the shaft 21 of the armature 22 of a brush shifting motor by means of an idler gear 23 and a pinion 24 fixed to shaft 21. The ring 20 is provided with a radial extension 25 which is adapted to engage the fixed stop 26. A spiral spring 27 is secured at one of its ends to the motor shaft 21 and at its other end to a fixed part of the vehicle. This spiral spring is adapted to bias the extension 25 to such a position relative to the stop 26 that the brushes 16 and 18 will be 180 electrical degrees from the position they will occupy when the extension 25 is in engagement with the stop 26.

A "third brush" generator provided with an armature 28, is connected to the crank shaft 1 of the internal combustion engine. The armature is provided with two main brushes 29 and 30 which are connected to a battery 31. The field 32 of the generator is connected across the main brush 30 and the third brush 33. This third brush generator is identical to the well known third brush lighting generator used on present day motor vehicles and is adapted to produce increased voltage across the brushes 29 and 33 upon increased speed of the armature. The voltage across the brushes 29 and 30 remains approximately constant regardless of the speed of the generator.

The brush 34 of the brush shifting motor is directly connected by wire 35 to the battery 31 and to the brush 29 of the third brush generator through the usual reverse current relay 54. Brush 36 of the brush shifting motor is connected by means of wire 37 to the brush 33 of the generator. It is, therefore, seen that there will be an increased flow of current through the armature of the brush shifting motor upon increased speed of the generator armature 28 since the voltage across brushes 29 and 33 increases with the increase of speed of the armature 28. The field 38 of the brush shifting motor is connected across the main brushes 29 and 30 of the third brush generator by connecting one end of the field by conductor 39 to conductor 35, and the other end to a ground 40 through wire 41. The brush 30 of the third brush generator is grounded at 42 to complete the circuit. It is thus seen that since the voltage across the brushes 29 and 30 is practically constant, the voltage across the terminals of field 38 of the brush shifting motor will also be practically constant.

The operation of the apparatus just described is as follows: Assuming the car is standing still and the internal combustion engine has been started, the driven shaft 5 will be stationary since the entire load of the vehicle is connected thereto. The crank shaft 1 will, therefore, rotate the armature 3 of the booster dynamo and by means of the gears 4, 7 and 9 the armature 10 of the clutch dynamo will be rotated in the opposite direction at a greater speed due to the fact that gear 9 is smaller than gear 4. The direction of rotation of the armature 10 will cause the clutch dynamo to operate as a generator and the direction of rotation of the armature 3 will cause the booster dynamo to operate as a motor due to the fact that the brushes thereof are held in a motor position by the spiral spring 27. The armature 10 of the clutch dynamo will send current through the field 15 and the armature 3 of the booster dynamo to cause the booster dynamo to add to the torque of the crank shaft and increase the torque on the driven shaft by means of gears 4, 7 and 9 since the current generated by the clutch dynamo produces a torque opposing rotation of the armature and the gear 9 connected thereto. This action continues until the torque on the driven shaft is sufficient to start the vehicle. The faster the driven shaft rotates, due to decrease in load thereon, the slower will be the rotation of the clutch dynamo armature and of the gear 9 as a result of the opposing torque produced by the generated current. A point will be reached, when the load has decreased sufficiently, where the clutch dynamo armature will be held substantially stationary by the torque opposing the rotation of the clutch dynamo armature. The ratio of speed between the crank shaft and the driven shaft is then dependent upon the ratios of the gears 4, 7 and 9, gear 9 being stationary. The speed of the crank shaft at this time has increased to such a value that the voltage across the brushes 29 and 33 of the third brush generator and, therefore, the voltage across the brushes 34 and 36 of the brush shifting motor, is large enough to cause the armature 22 of the brush shifting motor to have sufficient torque to wind up the spiral spring 27 to shift the ring 20 and move extension 25 against stop 26 and thereby shift the brushes 16 and 18 of the booster dynamo through 180 electrical degrees to change the booster dynamo from a motor to a generator. The changing of the booster dynamo from a motor to a generator causes current to be supplied to the clutch dynamo, causing it to operate as a motor whose armature rotates in the same direction as the armature 3 of the booster dynamo.

My invention comprises means whereby the booster dynamo and clutch dynamo can both be caused to act as generators under any conditions of operation and thereby produce a braking action on the driven shaft 5 of the vehicle. By means of switch 46 the brushes 12 and 13 of the clutch dynamo 10 may be connected together through a suitable resistance 43. The switch 46 is secured to a foot controlled switch operating member 47 which is also provided with a switch member 48 connected to the wire 37 leading from the brush 36 of the brush shifting motor. The switch 48 may be engaged with contacts 49 or 50, the former of which is connected to the brush 33 of the third brush generator, and the latter of which is connected to a ground 51. A spring 52 normally biases the switch 48 against the contact 49 and the switch 46 to open position.

Assuming that the vehicle is moving at a normal rate of speed with the booster dynamo operating as a generator and the clutch dynamo as a motor and it is desired to stop or retard the vehicle, the operator will "shut off" the engine and press the switch controlling member 47, thereby placing the resistance 43 in circuit with the armature 10 of the clutch dynamo. The movement of the switch controlling member will also simultaneously connect the armature of the brush shifting motor across the storage battery 31 and bring switch 48 into engagement with contact 50. The decrease in engine speed and, therefore, the decrease in voltage across the brushes 29 and 33 of the third brush generator will have no effect upon the torque of the brush shifting motor as it will now be receiving a constant voltage from the battery 31 which will be sufficient to maintain the booster dynamo brushes in generator position. As the booster dynamo continues to act as a generator, it will supply current to excite field 14 of the clutch dynamo. Since the armature 3 of the booster dynamo has slowed down, the action of the gears 4, 7 and 9 will cause the clutch dynamo to rotate at a faster rate of speed in the same direction of rotation as the driving and driven shafts. An E. M. F. will now be set up in the clutch dynamo armature due to the excitation of field 14. This will oppose the E. M. F. of the booster dynamo and will also cause a current to flow through the resistance 43. When the current in the resistance circuit becomes greater than the exciting current from the booster dynamo, the clutch dynamo will act as a generator. It is thus seen that by means of my invention both dynamo electric machines positively act as generators when the switch operating member 47 is operated, regardless of the speed of the engine or the functions being performed by the dynamo electric machines at the time a braking action is desired.

The brushes 16 and 18 may also be held in generator position by a mechanical means between the foot-operated member 47 and the ring 2, which is operative only when the member 47 is depressed.

Although I have described a specific type of electrical transmission to which I have applied my invention, it is obvious that it may be applied to other types of electrical transmission to secure the same results and I, therefore, do not intend that the scope of my invention be limited except as defined in the appended claims.

Having fully described my invention, what I claim as new and desire to secure by Letters Patent of the United States is:

1. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes, means responsive to the speed of one of the shafts for shifting said brushes to cause said dynamo-electric machine to act as a generator, and means for causing both of said dynamo-electric machines to simultaneously act as generators regardless of the speed of the shaft to which the brush shifting means is responsive.

2. In apparatus of the class described, the combination of a driving shaft, a driven shaft, means for transmitting power from the driving shaft to the driven shaft comprising a pair of dynamo-electric machines, one of which is provided with shiftable brushes whereby it may be caused to act either as a motor or as a generator, means biasing said brushes to motor position, means responsive to the speed of one of the shafts for maintaining said brushes in generating position, and independently operable auxiliary means for maintaining the brushes in said last named position.

3. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes, means responsive to the speed of one of the shafts for shifting said brushes to cause said dynamo-electric machine to act as a generator, a braking circuit comprising a resistance and a switch in circuit with the armature of the other dynamo-electric machine, and means operable with the switch for so controlling the shiftable brushes that said first mentioned dynamo-electric machine will act only as a generator when said switch is closed.

4. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes whereby the dynamo-electric machine may be caused to act as a motor or as a generator, means biasing said brushes to motor position, a motor for shifting the brushes to generator position, and means for causing said motor to hold said brushes in generator position and for simultaneously causing the other dynamo-electric machine to act as a generator.

5. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes whereby said machine may be caused to act as a motor or as a generator, means biasing said brushes to motor position, an auxiliary motor for shifting the brushes, means responsive to the speed of one of said shafts for impressing a variable voltage on the motor, and independently operable means for impressing a voltage on said motor independent of the speed of said shaft to cause the motor to maintain said brushes in generator position.

6. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes whereby the dynamo-electric machine may be caused to act as a motor or as a generator, means biasing said brushes to motor position, a motor for shifting the brushes, a generator responsive to the speed of one of the shafts for supplying a variable voltage to said motor whereby the auxiliary motor will shift the brushes to generator position upon a given speed of the shaft being attained, a resistance and a switch in circuit with the armature of the other dynamo-electric machine, and means operable when the switch is in closed position for impressing a voltage on said auxiliary motor to cause it to maintain said brushes in generator position.

7. In apparatus of the class described, the combination of a driving shaft, a driven shaft, a pair of electrically and mechanically connected dynamo-electric machines for transmitting power from the driving shaft to the driven shaft, one of said dynamo-electric machines being provided with shiftable brushes to cause said machine to act either as a motor or as a generator, the other of said dynamo-electric machines acting as a generator to supply power to the first named machine when the brushes are in motor position and as a motor when the first named machine acts as a generator, and means comprising a single operable member for positively causing both of said dynamo-electric machines to act as generators.

8. In apparatus of the class described, the combination of a driving shaft, a driven shaft, a pair of electrically and mechanically connected dynamo-electric machines for transmitting power from the driving shaft to the driven shaft, means responsive to the speed of one of the shafts for causing one of the dynamo-electric machines to act either as a motor or as a generator, the other of said dynamo-electric machines acting as a generator to supply power to the first named machine when it is acting as a motor and as a motor when the first named machine acts as a generator, and means comprising a single operable member for positively causing both of said dynamo electric machines to act as generators.

BRADLEY McCORMICK.